(12) United States Patent
Zone et al.

(10) Patent No.: US 6,758,463 B2
(45) Date of Patent: Jul. 6, 2004

(54) LIQUID DISTRIBUTOR INTERNAL BAFFLING

(75) Inventors: Ian Robert Zone, Woking (GB); Raymond Elliott Sacks, Upper Norwood (GB); Kenneth William Kovak, Macungie, PA (US); Mohammad Ali Kalbassi, Walton-on-Thames (GB); Steven Ray Auvil, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 218 days.

(21) Appl. No.: 09/990,410

(22) Filed: Nov. 21, 2001

(65) Prior Publication Data

US 2003/0094709 A1 May 22, 2003

(51) Int. Cl.[7] .................................................. B01F 3/04
(52) U.S. Cl. ............................ 261/97; 261/110; 62/121
(58) Field of Search ............................. 62/121; 264/97, 264/110, 114.1

(56) References Cited

U.S. PATENT DOCUMENTS

| | | | |
|---|---|---|---|
| 3,006,623 A | * | 10/1961 | Ross et al. |
| 3,146,609 A | * | 9/1964 | Engalitcheff, Jr. |
| 3,410,540 A | * | 11/1968 | Bruckert |
| 4,385,010 A | * | 5/1983 | Bosne |
| 4,627,941 A | * | 12/1986 | Bentham |
| 5,752,538 A | | 5/1998 | Billingham et al. |
| 5,776,316 A | * | 7/1998 | Potthoff et al. |
| 5,814,249 A | * | 9/1998 | Dolan |
| 5,914,011 A | * | 6/1999 | Yeoman et al. |
| 6,086,055 A | | 7/2000 | Armstrong |
| 6,253,571 B1 | | 7/2001 | Fujii et al. |
| 6,395,139 B1 | * | 5/2002 | Potthoff |
| 6,527,258 B2 | * | 3/2003 | Bartlok |
| 2003/0011084 A1 | * | 1/2003 | Bosmans et al. |
| 2003/0038385 A1 | * | 2/2003 | Bosmans et al. |

FOREIGN PATENT DOCUMENTS

JP   09/075602 ABSTRACT   7/1997

* cited by examiner

Primary Examiner—Scott Bushey
(74) Attorney, Agent, or Firm—Willard Jones, II

(57) ABSTRACT

An apparatus for distributing a liquid in an exchange column includes a plate and at least one elongated internal baffle. The plate has at least one elongated channel, which has a first longitudinal axis, a bottom, and at least one aperture in the bottom. At least a substantial portion of the internal baffle, which has a second longitudinal axis substantially parallel to the first longitudinal axis, is disposed in the channel.

18 Claims, 5 Drawing Sheets

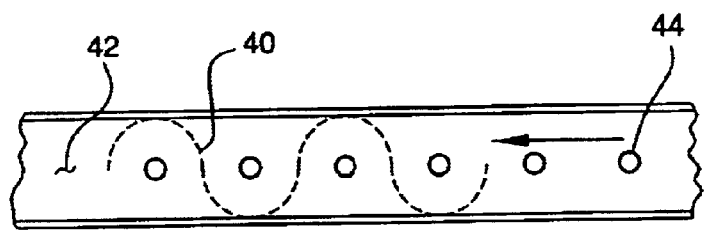
FIG. 6A
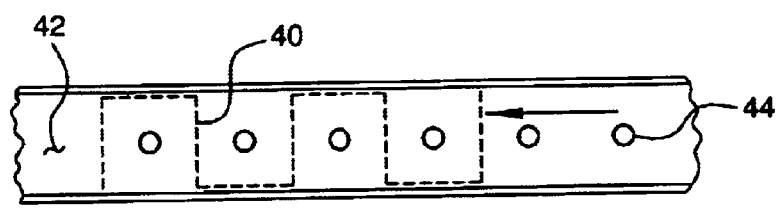
FIG. 6B
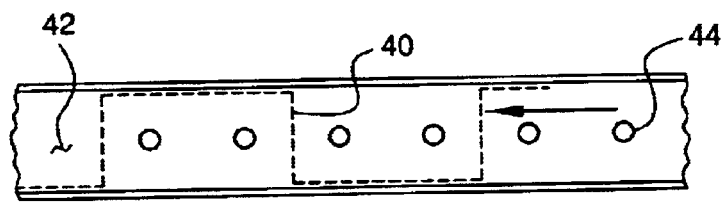
FIG. 6C
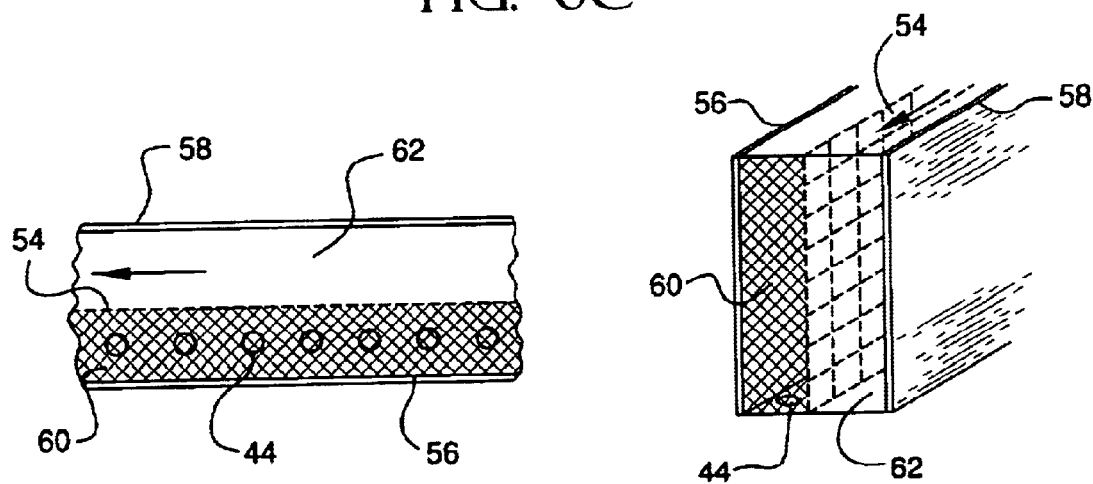
FIG. 7A
FIG. 7B

US 6,758,463 B2

LIQUID DISTRIBUTOR INTERNAL BAFFLING

BACKGROUND OF THE INVENTION

The present invention relates to an apparatus and a method for distributing a liquid from a liquid distributor to a packing in an exchange column for heat and/or mass transfer processes. The apparatus and method have particular application in cryogenic air separation processes utilizing distillation, although the apparatus and method may be used in other heat and/or mass transfer processes that use liquid distributors and packing (e.g., random or structured packing).

The term, "column", as used herein, means a distillation or fractionation column or zone, i.e., a column or zone wherein liquid and vapor phases are countercurrently contacted to effect separation of a fluid mixture, such as by contacting of the vapor and liquid phases on packing elements.

The term "packing" means solid or hollow bodies of predetermined size, shape, and configuration used as column internals to provide surface area for the liquid to allow mass transfer at the liquid-vapor interface during countercurrent flow of two phases. Two broad classes of packings are "random" and "structured".

"Random packing" means packing wherein individual members do not have any particular orientation relative to each other or to the column axis. Random packings are small, hollow structures with large surface area per unit volume that are loaded at random into a column. "Structured packing" means packing wherein individual members have specific orientation relative to each other and to the column axis. Structured packings usually are made of expanded metal or woven wire screen stacked in layers or as spiral windings; however, other materials of construction, such as plain sheet metal, may be used.

The terms "orifice," "hole," and "aperture" are used interchangeably herein to mean an opening through which a fluid may pass. Although circular orifices are shown in the drawings, the orifices may have other shapes, including irregular as well as regular shapes.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen).

Various packings may be used to bring the liquid and gaseous phases of the mixture into contact to accomplish mass transfer between the phases. The use of packing for distillation is standard practice and has many advantages where pressure drop is important. However, packed column performance is very dependent on creating and mantaining a balance between the downward flow of liquid and the upward flow of vapor locally in the packing. The distribution of the liquid and the vapor within the packing as influenced by the initial presentation of these fluids to the packing.

Initial presentation of liquid and vapor to the packing is usually made by means of distributors. A liquid distributor, the role of which is to irrigate the packing uniformly with liquid, is located above the packing, while a vapor distributor, the role of which is to create uniform vapor flow below the packing, is located below the packing.

There are three main types of typical liquid distributors—pipe, pan, and trough distributors. Each type is discussed briefly below.

Pipe distributors are comprised of an interconnecting network of closed pipes or ducts, typically comprising a central pipe or manifold and a number of arms or branches radiating from the central pipe. The arms are perforated to allow the liquid passing from the central pipe and into the arms to be dripped or sprayed onto a packed bed below the pipe distributor. Upwardly flowing vapor passes easily in-between each arm. Pipe distributors receive liquid from a separate liquid collector or an external source piped through the wall of the column. While simple and inexpensive to construct, pipe distributors may distribute liquid poorly when vapor gets trapped in the arms.

Pan distributors are comprised of a pan or pot having holes in the bottom for feeding liquid to the packing below and tubes or risers for the vapor to pass upwardly through the distributor. Pan distributors often make a complete seal with the wall of a column. Thus, pan distributors can act as liquid collectors as well as distributors. However, since large pan distributors are costly to build, pan distributors usually are used in smaller columns, i.e., columns with diameters less than 1.5 meters.

Trough distributors comprise a collection of interconnecting open troughs or channels having irrigation holes in the base to feed liquid to the packing below. At least one upper collection trough, or a simple pot on top of the lower troughs, feeds liquid to the lower troughs through a series of holes or overflowing notches. Vapor from the packing below passes upward between the liquid-containing troughs.

FIG. 1 shows a typical liquid distributor 10 of the trough type. Liquid from feed assembly 12 enters a pre-distributor 14, which distributes the liquid to the distributor. The distributor is mounted on a combined hold-down/support grate (not shown) above the packing (not shown).

After entering the distributor 10, the liquid flows in a plurality of channels or troughs 18 spaced apart by vapor risers 16 throughout the distributor. A typical main channel 17 and multiple troughs or channels 18 on each side of the main channel 17 are shown in FIG. 2. Liquid from the main channel enters each channel at the inlet end 20 of the channel and flows in a direction 22 away from the inlet end. Streams of liquid 24 then exit each channel through orifices or holes 26 in the bottom 28 of the channel. If the liquid does not flow from the holes in uniform directions, some areas of the packing below the distributor are under irrigated areas 30 while other areas of the packing are over irrigated areas 32, as shown in FIG. 2. Also, some of the liquid may impact internal structures between the bottom of the distributor and the packing, such as distributor supports/hold-down grates 34, as shown in FIG. 2. (These internal structures may support the distributor and/or hold down the packing.)

Some liquid distributors used in distillation processes are disclosed in U.S. Pat. No. 5,752,538 (Billingham, et al.); U.S. Pat. No. 5,240,652 (Taylor, et al.); U.S. Pat. No. 6,086,055 (Armstrong, et al.); U.S. Pat. No. 4,729,857 (Lee, et al.); U.S. Pat. No. 5,192,465 (Petrich, et al.); and U.S. Pat. No. 5,645,770 (McNulty, et al.).

The prior art distributors generally use three types of distribution regulation mechanisms: the weir type, where liquid flows horizontally through a gap; the orifice type, where liquid flows vertically, or horizontally, usually through a circular hole; and the pressure type, where feed under pressure is distributed through a series of spray nozzles. The orifice type is distinguished by the fact that the flow rate of liquid through the hole is proportional to the square root of the height of liquid above the orifice. For a narrow weir, the flow can be taken as being proportional to the height of liquid raised to the power 1.5. Use of orifices is often preferred because the effects of minor changes in the liquid level or the levelness of the distributor are reduced by having the flow rate being proportional to the height squared if a reasonable liquid depth is used. However, this comes at the expense of reducing the operating range of a simple distributor because the height available for the distributor is often limited. Weir type distribution is often preferred when a large amount of liquid must be distributed, high range-ability is required, or in the pre-distribution section of the distributor.

In the case of orifice type distribution, the thickness of the orifice material plays an important part in regulating the flow and the direction of the liquid stream. Orifices generally may be divided into two classes—those in thick material and those in thin material. For a material to be classified as thick, the liquid flow must be fully developed within the thickness of the material, which gives rise to a high L/D ratio (where L is the material thickness and D is the diameter of the hole). For a thin material, the L/D ratio is lower, normally below 1.0. For an orifice in a thick material, the stream generally will emerge in line with the axis of the orifice, while in a thin material the stream will emerge at an angle with the axis of the orifice, which angle is determined by the direction of any cross-flow velocity in the liquid above the orifice. In any distributor, this cross-flow velocity is caused by the natural movement of liquid to the distribution orifices.

Since the use of thin materials often is advantageous due to ease of bending and manufacturing, many liquid distributors are constructed using channels which are made from thin material and bent to shape. The orifices are punched or drilled through a thin metal sheet prior to the bending process of forming the trough shape. Unfortunately, an orifice in a thin material suffers from the characteristic that the cross-flow velocity near the entrance to the orifice will influence the direction of the exiting stream biasing it in the direction of said cross-flow velocity. Although experiments have shown that a relatively severe cross-flow velocity is required to significantly affect the actual flow rate of the stream, the fact that the stream does not leave in line with the axis of the orifice means that two problems are encountered: 1) the stream does not land where it is expected to on the packing; and 2) during quality testing of the distributor, it is difficult to measure the performance accurately. A stream that has an inaccurate trajectory (i.e., does not flow as desired to the packing) may come into contact with other components, such as distributor support/hold-down grates 34, as illustrated in FIG. 2.

The most common way of eliminating the problems associated with streams leaving the orifices in a non-vertical direction is to add some form of tube to the outlet side of the orifice. These tubes are normally part welded onto the underside of the channel, with the orifice located at the center of the tube. The tube then directs the liquid straight down, regardless of the actual trajectory that the liquid has when it leaves the orifice. However, the use of these tubes is both expensive, as each tube must be individually attached to the main channel and/or the troughs or channels, and cumbersome, as the tubes are vulnerable to damage during handling. Therefore, use of such tubes normally is limited to those areas of the liquid distributor where high cross-flow velocities are expected. An additional problem with the tubes is that the tubes correct the directional problem after the liquid has left the orifice. However, in extreme cases, when the flow rate through the orifice is high, the cross-flow velocities above the orifice can significantly affect the flow rate through the orifice, which will lead to non-uniform distribution of liquid onto the packing.

Another approach to addressing the problems of streams not flowing vertically from the distributor is disclosed in U.S. Pat. No. 5,051,214 (Chen, et al.), where a pre-distributor is extended over the troughs in order to transfer the liquid from the pre-distributor to the distributor over a wider area. By introducing liquid directly into the troughs, the cross-flow velocity is reduced at what would be the feed end of the trough. The primary shortcoming of this approach is the cost of the complex pre-distributor. Also, the design takes up some of the space at the top of the channels, thereby reducing the design height available for the liquid, thus reducing the operable range of the distributor.

It is desired to have an apparatus and a method for distributing a liquid in an exchange column with a liquid distributor which mitigates the effects of cross-flow velocity on the direction of liquid streams from the liquid distributor.

It is further desired to have an apparatus and a method for distributing a liquid in an exchange column with a liquid distributor which will reduce or prevent the bulk flow of liquid in directions that is not desirable.

It is still further desired to have an apparatus and a method for distributing a liquid in an exchange column with a liquid distributor which can better control the flow of liquid to specific areas of the liquid distributor.

It is still further desired to have an apparatus and a method for distributing a liquid in an exchange column having packing which eliminate or mitigate under irrigation and over irrigation of the packing.

It is still further desired to have an apparatus and a method which overcome the difficulties, problems, limitations, disadvantages, and deficiencies of the prior art to provide better and more advantageous results.

It is still further desired to have a method of assembling a liquid distributor for exchange columns which affords better liquid distribution than the prior art liquid distributors, and which also overcomes many of the difficulties and disadvantages of the prior art to provide better and more advantageous results.

It is still further desired to have a new, more efficient method for the distribution of a liquid and a vapor in exchange columns.

It is still further desired to have a liquid distributor that shows high performance characteristics for cryogenic applications, such as those used in air separation, and for other heat and/or mass transfer applications.

It also is desired to have a more efficient air separation process utilizing a liquid distributor which is more efficient than the prior art.

BRIEF SUMMARY OF THE INVENTION

The invention is an apparatus for distributing a liquid in an exchange column. The invention also includes a method for adjusting a flow direction of a stream of a liquid exiting an aperture in an elongated channel within a plate for distributing liquid in an exchange column. In addition, the invention includes a method for assembling a distributor for distributing a liquid to a packing in an exchange column.

A first embodiment of the apparatus includes a plate and at least one elongated internal baffle. The plate has at least one elongated channel, which has a first longitudinal axis, a bottom, and at least one aperture in the bottom. The internal baffle has a second longitudinal axis substantially parallel to the first longitudinal axis, and at least a substantial portion of the internal baffle is disposed in the channel.

There are many variations of the first embodiment of the apparatus. For example, the internal baffle may have a triangular shape or a zig-zag shape. In another variation, a part of the internal baffle is adjacent the aperture. In yet another variation, at least a portion of the internal baffle is perforated. In still yet another variation, the internal baffle has a plurality of edges, and at least one edge has a non-linear shape. In still yet another variation, the internal baffle has a plurality of perforations and divides the channel into generally parallel spaced apart first and second subchannels, the subchannels being in fluid communication across the perforations. In this variation, the first subchannel has at least one aperture and the second subchannel has a substantially fewer number of apertures (which can be zero) than the first subchannel.

A second embodiment of the apparatus is similar to the first embodiment, but includes a control baffle. At least a substantial portion of the control baffle is disposed in another channel having a third longitudinal axis at an angle with the first longitudinal axis and is in fluid communication with the channel having the first longitudinal axis.

Another aspect of the invention is an exchange column for exchanging heat and/or mass between a liquid and a vapor, the exchange column having at least one apparatus for distributing a liquid in the exchange column like the first embodiment of the apparatus discussed above.

Yet another aspect of the invention is a process for cryogenic air separation comprising contacting liquid and vapor counter-currently in at least one distillation column containing at least one mass transfer zone, wherein liquid-vapor contact is established by at least one packing, and wherein liquid is distributed to the packing by an apparatus like that in the first embodiment of the apparatus discussed above.

There are several steps in the first embodiment of the method for adjusting a flow direction of a stream of liquid exiting an aperture in an elongated channel within a plate for distributing liquid in an exchange column, the elongated channel having a first longitudinal axis, a bottom, and at least one aperture in the bottom. The first step is to provide at least one elongated internal baffle having a second longitudinal axis. The second step is to place at least a substantial portion of the internal baffle inside the channel in a position whereby the second longitudinal axis is substantially parallel to the first longitudinal axis.

There are several variations of the first embodiment of the method for adjusting a flow direction. For example, at least a section of the internal baffle may have a triangular shape or a zig-zag shape. In another variation, a part of the internal baffle is adjacent the aperture. In yet another variation, at least a portion of the internal baffle is perforated. In still yet another variation, the internal baffle has a plurality of edges, and at least one edge has a non-linear shape. In still yet another variation, the internal baffle has a plurality of perforations and divides the channel into generally parallel spaced apart first and second subchannels, the subchannels being in fluid communication across the perforations. In this variation, the first subchannel has at least one aperture and the second subchannel has a substantially fewer number of apertures (which can be zero) than the first subchannel.

In a second embodiment of the method for adjusting a flow direction of a stream of liquid exiting an aperture, there are several additional steps. The first additional step is to provide at least one control baffle. The second additional step is to place at least a substantial portion of the control baffle in another channel within the plate, the other channel having a third longitudinal axis at an angle with the first longitudinal axis and being in fluid communication with the channel having the first longitudinal axis.

A first embodiment of the method for assembling a distributor for distributing a liquid to a packing in an exchange column includes multiple steps. The first step is to provide the exchange column. The second step is to provide the distributor, which includes a plate and at least one elongated internal baffle. The plate has at least one elongated channel, the channel having a first longitudinal axis, a bottom, and at least one aperture in the bottom. The internal baffle has a second longitudinal axis substantially parallel to the first longitudinal axis, and at least a portion of the internal baffle is disposed in the channel. The third step is to install the distributor in the exchange column.

A second embodiment of the method for assembling a distributor is similar to the first embodiment, but the distributor includes an additional element. In this embodiment, the distributor includes at least one control baffle, and at least a substantial portion of the control baffle is disposed in another channel within the plate, the another channel having a third longitudinal axis at an angle to the first longitudinal axis of the channel.

BRIEF DESCRIPTION OF SEVERAL VIEWS OF THE DRAWINGS

The invention will be described by way of example with reference to the accompanying drawings, in which:

FIGS. 6A, 6B, and 6C are schematic plan views of perforated internal baffles having different shapes in a channel with orifices for other embodiments of the invention;

FIG. 7A is a schematic plan view illustrating a perforated baffle in a channel with orifices in a portion of the channel on one side of the baffle for another embodiment of the invention;

FIG. 7B is a schematic diagram illustrating an end view of the embodiment shown in FIG. 7A;

DETAILED DESCRIPTION OF THE INVENTION

Figure 9:
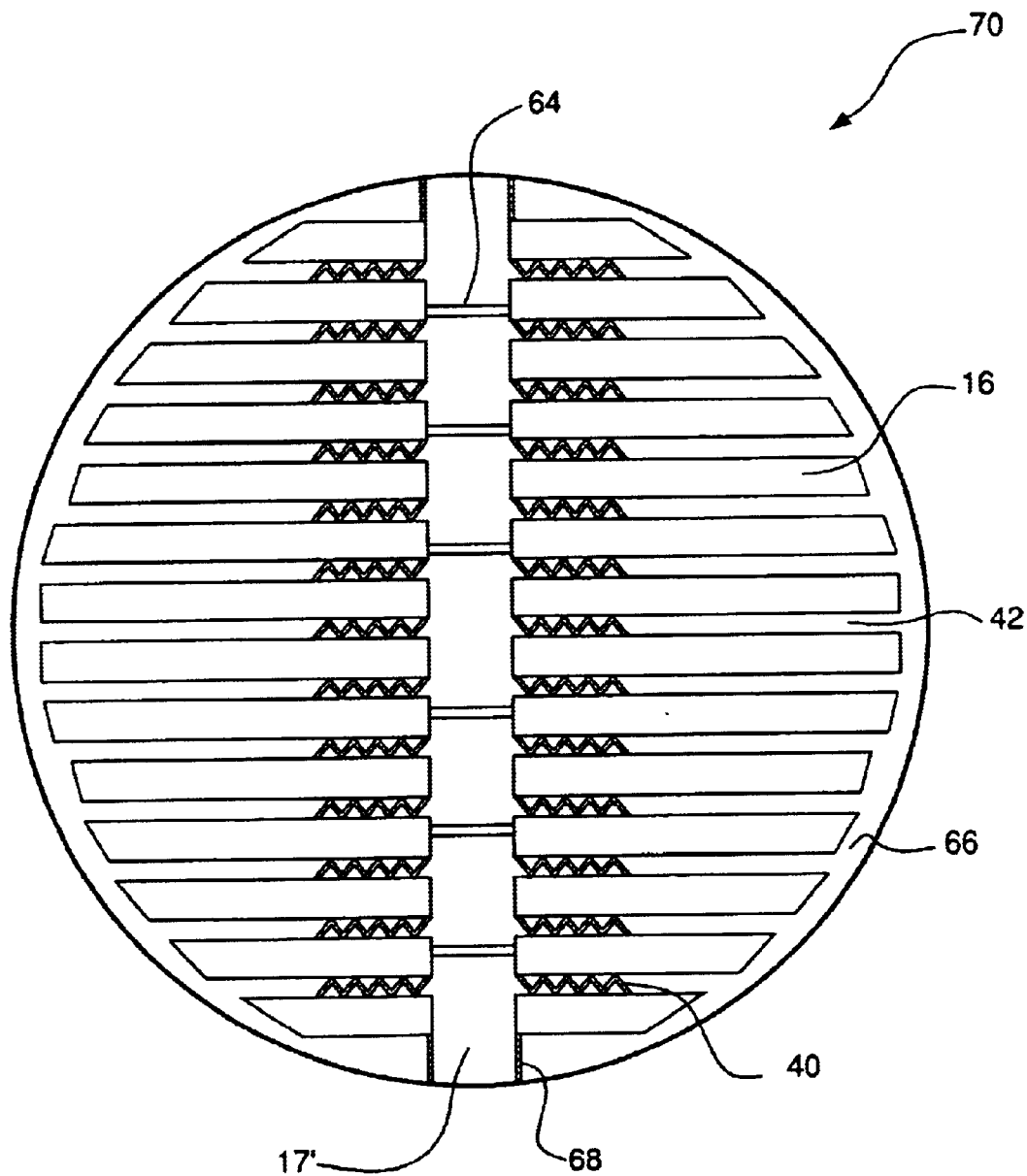
FIG. 9 is a schematic plan view of a liquid distributor using internal baffles and control baffles in accordance with one embodiment of the invention.

Referring to FIGS. 5 and 6A-6C, the present invention uses internal baffles 40 in the channels or troughs 42 of a liquid distributor (not shown) to obtain improved performance in several ways. First, the use of the internal baffles mitigates the effect of cross-flow velocity on the direction of a stream of liquid in the liquid distributor by reducing or eliminating the cross-flow adjacent an orifice 44 in a channel 42 of the liquid distributor. Second, the use of control baffles (64, 68) within areas that normally are large open areas, as shown in FIG. 9, reduces or prevents the bulk flow of liquid in directions that is not desirable. Third, the use of control baffles can control the liquid flow to specific areas of the liquid distributor. All three of these concepts may be used alone or in combination. In addition, the fluid flow along the channels or troughs of the liquid distributor can be separated from the region above the holes in an alternate embodiment, as shown in FIGS. 7A and 7B and discussed below.

Figure 1:
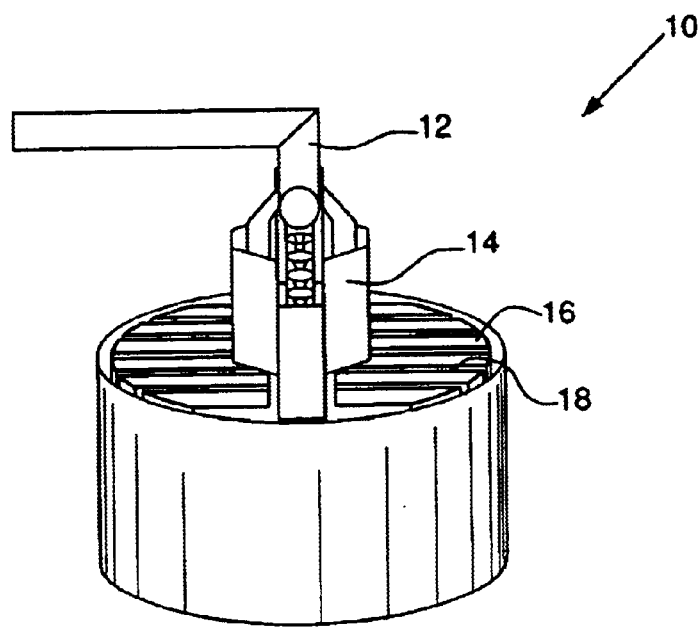
FIG. 1 is a schematic diagram of a typical liquid distributor.
Figure 2:
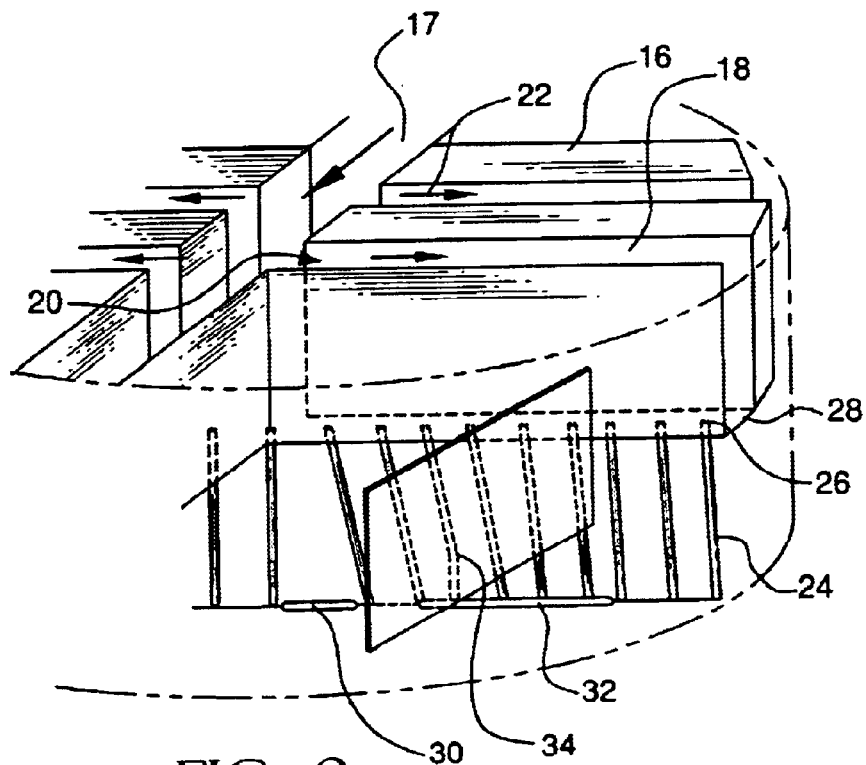
FIG. 2 is a schematic diagram illustrating liquid flow in a channel of a liquid distributor and liquid flow from orifices at the bottom of the channel to a packing below the liquid distributor.
Figure 3:
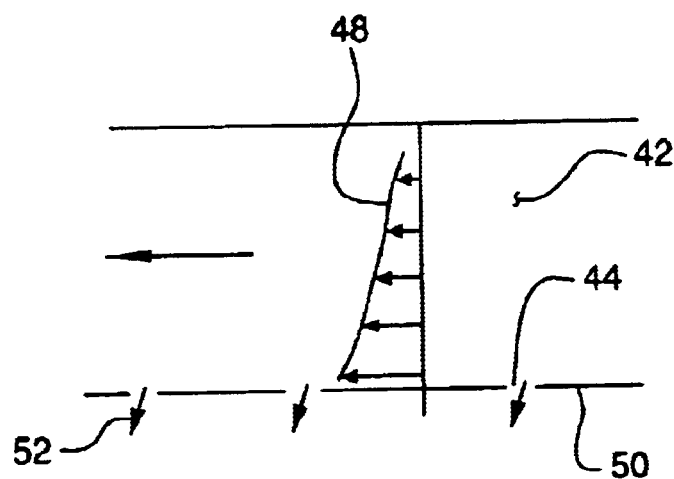
FIG. 3 is a schematic diagram illustrating the velocity profile of a liquid flowing in an open channel with orifices.
Figure 4:
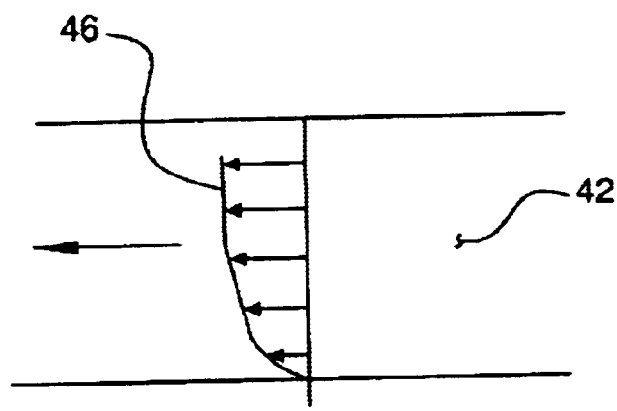
FIG. 4 is a schematic diagram illustrating the velocity profile of a liquid flowing in an open channel without orifices.

Referring to FIGS. 3 and 4, the velocity profile 46 of a liquid in an open channel 42 without orifices is illustrated in FIG. 4, and the velocity profile 48 of a liquid in an open channel 42 with orifices 44 in the bottom 50 of the channel is shown in FIG. 3. As shown in FIG. 3, the highest velocity in the channel with orifices is at the bottom of the channel. As a result, there is an effect on the direction of liquid leaving the orifices, as indicated by the arrows 52.

Figure 5:
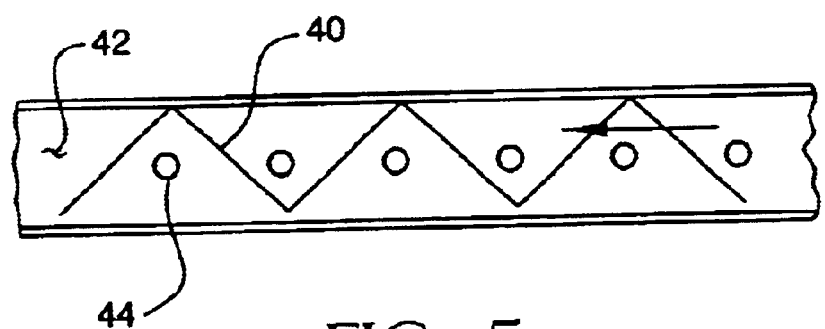
FIG. 5 is a schematic plan view of a solid internal baffle having a triangular shape in a channel with orifices for one embodiment of the invention.

Also, the velocity profile 48 of liquid flowing in an open channel 42 with orifices 44 (FIG. 3) is "self-generating" in that the velocity profile will reappear very rapidly if altered. For example, if a single internal baffle 40, such as the internal baffle shown in FIG. 5, is placed at the bottom (not shown) of a channel 42 and covers less than the full length of the channel, the internal baffle will reduce the cross-flow on the bottom or floor of the channel to zero (i.e., similar to the bottom of the velocity profile 46 of an open channel without orifices shown in FIG. 4) in the region near the internal baffle. However, after a relatively short distance beyond the internal baffle, the inverted velocity profile will re-establish itself to a velocity profile such as that shown in FIG. 3.

In one embodiment, the internal baffle 40 is triangular in shape, as shown FIG. 5. However, other types of baffles may be used to obtain the desired effect, including a ladder type, a castellated type, and other shapes. Some other shapes of the internal baffles include the zig-zag shapes illustrated in FIGS. 6A, 6B, and 6C. The internal baffles may or may not run the length of a channel, depending on the magnitude of the cross-flow velocity at any particular point.

The internal baffles 40 may be solid, as illustrated in FIG. 5, or perforated as illustrated in FIGS. 6A to 7B. Persons skilled in the art will recognize that many combinations are possible. For example, the perforations need not be made in a regular pattern as shown in FIGS. 6A to 7B. Also, different portions of an internal baffle may be perforated in one manner, while other portions of the same internal baffle may be perforated in another manner or may have no perforations at all (i.e., one or more portions may be solid while other portions are perforated). In addition, within the same liquid distributor, different variations of the internal baffles could be used in each of the various troughs so that the distributor would contain a variety of internal baffles.

Also, the edges of the internal baffles 40 may be treated or finished in different ways. For example, the upper and/or lower edges of the internal baffles could have a non-linear shape, e.g., serrated, notched, curled over, or finished in other ways.

As shown in FIG. 6C, it is not necessary to "protect" or surround each orifice 44 in the same manner as every other orifice in a trough or channel 42, depending on the magnitude of the cross-flow velocity at the orifice. Close attention must be paid to the clearance around the orifices to ensure that the direction of flow through an orifice is along the axis of the orifice and is not adversely effected by the presence of the internal baffles 40 being too close on one side or the other.

Since the internal baffles 40 (such as those shown in FIGS. 5, 6A, 6B, and 6C) will alter the hydraulic resistance of the areas in which the baffles are placed, and hence the liquid flow characteristics of the distributor, "control baffles" (64, 68) also may be used to counter the impact of the internal baffles, as shown in FIG. 9. The control baffles are used to maintain an equal hydraulic resistance in all directions to compensate for the impact of the internal baffles and/or direct liquid to or from particular areas by again altering the hydraulic resistance of the route to or from that area. As with the internal baffles, the control baffles may be solid, or perforated, or may have a combination of solid and perforated portions. Also, the edges of the control baffles may be treated or finished in different ways, similar to the edge treatment or finish previously discussed for the internal baffles.

Figure 8:
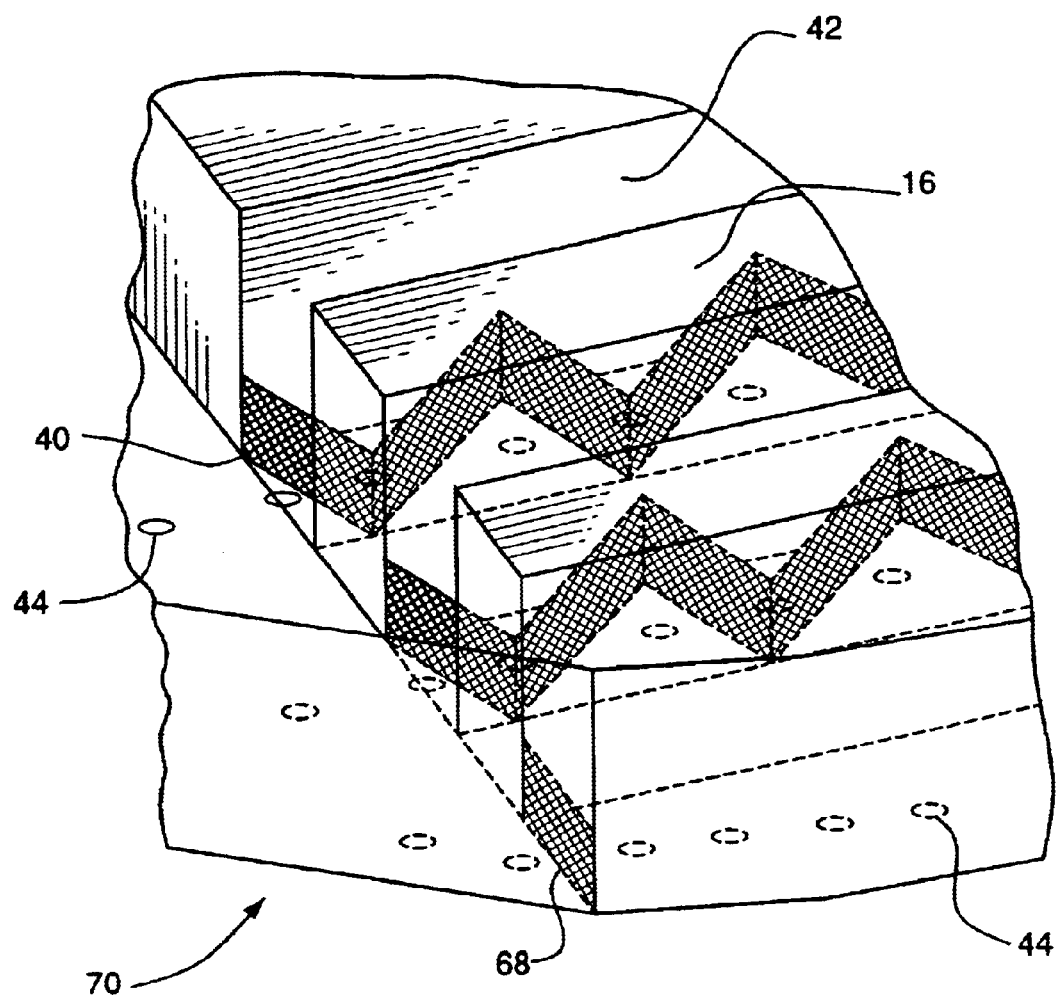
FIG. 8 is a schematic diagram illustrating internal baffles in the troughs of a liquid distributor and a control baffle at the entrance of the gutter of the distributor.

As shown in FIG. 9, control baffles 64 are placed in the main channel 17', which is where liquid enters the liquid distributor 70, and additional baffles 68 are placed at the entrance to the gutter region 66. FIG. 8 provides another view of a control baffle 68 at the entrance of the gutter region. This control baffle 68 keeps the hydraulic resistance of the channels that do not need internal baffles the same as the hydraulic resistance of the channels 42 where the internal baffles 40 have been added. This keeps the flows around the liquid distributor as uniform as possible and prevents areas getting higher cross-flow than before because of the use of the internal baffles.

The locations of the internal baffles 40 and the control baffles (64, 68) are not limited to any particular locations given. The internal baffles and the control baffles may be freely mixed throughout the liquid distributor 70, depending on the exact details of each distributor. For example, internal baffles may be made continuous across the center liquid entry area from one channel 42 to the next, or control baffles may be required at the end of some of the channels.

The aim of the control baffles (64, 68) is to balance the hydraulic resistance at various locations within the liquid distributor 70 to give as uniform cross-flow velocities around the distributor as possible (thus avoiding "hot spots" of velocity), so that when internal baffles 40 are added to mitigate the effect of cross-flow velocity on the orifices 44, the resistance of the channels 42 is changed. This will cause more flow in other channels and/or the gutter regions 66 and the flows around the distributor will reach a new state of equilibrium. Then, high flows in the channels and/or gutter regions may be experienced without the internal baffles. To compensate for this, control baffles may be added to balance the resistances again.

Normally, in a liquid distributor having no internal baffles, the liquid will flow in such a manner that the liquid will take the path of least resistance to reach its destination. However, when internal baffles 40 are placed in the channel 42, the impact of the addition of the walls of the internal baffles acts as a barrier to liquid flow by reducing the cross-sectional area available for the liquid to flow. (Generally the walls of the internal baffles are "vertical," i.e., generally at a 90° angle to the floor or the bottom of the trough, although the walls may be positioned at other angles relative to the floor.) This extra resistance causes liquid to take an alternative route if one is available. By adding control baffles (64, 68) at strategic locations around the liquid distributor 70 where the internal baffles have not been fitted, the liquid flow around the distributor can be controlled back to, or even better than, the liquid flow of the distributor without internal baffles. This is illustrated in FIG. 9. Without the control baffles, the internal baffles may cause more liquid to flow through a region than would have occurred if the internal baffles were not used.

In addition, the control baffles (64, 68) may be used in a liquid distributor 70 without internal baffles. For example, in some cases, the path of least hydraulic resistance causes excessive liquid flow in one region of a liquid distributor. In such a case, increasing the hydraulic resistance through that region by adding control baffles can redistribute the flows, such as within the channels 42, to provide more uniform velocities.

Another use of the baffles of the present invention is to restrain the ability of liquid in a liquid distributor to move in any direction in areas of the distributor that are more open, thereby preventing unconstrained and unexpected flow patterns to develop. For example, parts of a liquid distributor around the liquid entry points have relatively large open areas in which liquid can move freely. The liquid in these areas can be turbulent, causing problems with the streams leaving orifices in the channels of these areas. The use of the baffles of the present invention can mitigate these problems.

Basically, the addition of any baffle adds resistance to the flow of liquid at that point. By adding some extra resistance, for example in the main channel, liquid can be restrained to some extent from being able to move freely in any direction. This free movement in any direction can create the aforementioned cross-velocities in any direction, thus causing stream angularity. Appropriate placement of the baffles will fix this.

Another embodiment of the invention is illustrated in FIGS. 7A and 7B. In this embodiment, rather than placing a baffle along the bottom of the channels of a liquid distributor, an upright perforated baffle 54 is placed between the opposing walls (56, 58) of the trough or channel, thereby creating an area 62 for easy liquid flow down the length of the trough and an area 60 of no flow down the length of the trough. In the area of no flow, which contains orifices 44, there is no flow down the length of the trough, and all of the flow enters this area perpendicular to the trough length through the upright perforated baffle. The area 62 for easy liquid flow normally has no orifices, although this area could have some orifices as long as the number of orifices is substantially fewer than the number of orifices in the area 60 of no flow.

The perforated baffle 54 should be strong enough so that it can be attached to another structure(s) (not shown) at the bottom and the top of the baffle without bending. Internal supports (not shown) located at regular intervals in the channel may help hold the perforated baffle in place. Preferably, the area 60 of no flow is filled with something that prevents liquid from easily flowing through, such as dumped packing (not shown). If the internal supports are placed close enough together, that may be adequate and the dumped packing may not be required. Close attention must be paid to the clearance over the orifices 44 to ensure that the flow through the orifices is not affected by the presence of the material used to cause the high resistance. The net effect of this is that the highest velocity liquid will be in the low resistance area 62, and the high resistance area 60 will have a very low and calm flow to the orifices.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An apparatus for distributing a liquid to a packing in an exchange column, comprising:

a plate located above the packing, the plate having at least one elongated channel, the channel having a first longitudinal axis, a bottom, and at least one aperture in the bottom; and at least one elongated internal baffle having an upper edge, a lower edge opposite the upper edge, and a second longitudinal axis substantially parallel to the first longitudinal axis, at least a substantial portion of the internal baffle being disposed in the channel and at least a portion of the lower edge adjacent or touching the bottom of the channel.

2. An apparatus as in claim 1, wherein a part of the internal baffle is adjacent the aperture.

3. An apparatus as in claim 1, wherein at least a section of the internal baffle has a triangular shape.

4. An apparatus as in claim 1, wherein at least a section of the internal baffle has a zig-zag shape.

5. An apparatus as in claim 1, wherein at least a portion of the internal battle is perforated.

6. An apparatus as in claim 1, wherein at least a portion of the upper edge or the lower edge has a non-linear shape.

7. An apparatus as in claim 1, further comprising a control baffle, at least a substantial portion of the control baffle being disposed in another channel having a third longitudinal axis at an angle with the first longitudinal axis and being in fluid communication with the channel having the first longitudinal axis.

8. An apparatus as in claim 1, wherein the internal baffle has a plurality of perforations and divides the channel into generally parallel spaced apart first and second subchannels, the subchannels being in fluid communication across the perforations, wherein the first subchannel has at least one aperture and the second subchannel has a substantially fewer number of apertures than the first subchannel.

9. An exchange column for exchanging heat and/or mass between a liquid and a vapor, the exchange column having at least one apparatus for distributing a liquid in the exchange column as in claim 1.

10. A process for cryogenic air separation comprising contacting liquid and vapor counter-currently in at least one distillation column containing at least one mass transfer zone, wherein liquid-vapor contact is established by at least one packing, and wherein liquid is distributed to the packing by an apparatus as in claim 1.

11. A method for adjusting a flow direction of a stream of a liquid exiting an aperture in an elongated channel within a plate located above a packing in an exchange column for distributing liquid to the packing, the elongated channel having a first longitudinal axis, a bottom, and at least one aperture in the bottom, comprising the step of:

providing at least one elongated internal baffle having an upper edge, a lower edge opposite the upper edge, and a second longitudinal axis; and placing at least a substantial portion of the internal baffle inside the channel in a position whereby the second longitudinal axis is substantially parallel to the first longitudinal axis and at least a portion of the lower edge is adjacent or touching the bottom of the channel.

12. A method as in claim 11, wherein a part of the internal baffle is adjacent the aperture.

13. A method as in claim 11, wherein at least a section of the internal baffle has a triangular shape.

14. A method as in claim 11, wherein at least a section of the internal baffle has a zig-zag shape.

15. A method as in claim 11, wherein at least a portion of the internal baffle is perforated.

16. A method as in claim 11, wherein at least a portion of the upper edge or the lower edge has a non-linear shape.

17. A method as in claim 11, comprising the further steps of:

providing at least one control baffle;

placing at least a substantial portion of the control battle in another channel within the plate, the another channel having a third longitudinal axis at an angle with the first longitudinal axis and being in fluid communication with the channel having the first longitudinal axis.

18. A method as in claim 11, wherein the internal baffle has a plurality of perforations and divides the channel into generally parallel spaced apart first and second subchannels, the subchannels being in fluid communication across the perforations, wherein the first subchannel has at least one aperture and the second subchannel has a substantially fewer number of apertures than the first subchannel.

* * * * *